United States Patent

Ball et al.

[15] 3,670,017

[45] June 13, 1972

[54] PRODUCTION OF UNSATURATED ALIPHATIC ACIDS

[72] Inventors: William John Ball, Capel; Edward James Gasson, Kingswood, both of England

[73] Assignee: The Distillers Company Limited, Edinburgh, Scotland

[22] Filed: Jan. 12, 1971

[21] Appl. No.: 105,952

Related U.S. Application Data

[63] Continuation of Ser. No. 596,086, Nov. 22, 1966, abandoned.

[30] Foreign Application Priority Data

Dec. 16, 1965   Great Britain ...................... 53,552/65

[52] U.S. Cl. .......................................... 260/530 N, 252/470
[51] Int. Cl. .......................................................... C07c 51/32
[58] Field of Search ............................................. 260/530 N

[56] References Cited

UNITED STATES PATENTS

| | | | |
|---|---|---|---|
| 3,409,665 | 11/1968 | Brown et al. | 260/530 N |
| 3,408,392 | 10/1968 | Yamagishi et al. | 260/530 N |
| 3,595,910 | 7/1971 | Ball | 260/530 N |

FOREIGN PATENTS OR APPLICATIONS

| | | | |
|---|---|---|---|
| 6,501,294 | 8/1965 | Netherlands | 260/530 N |
| 1,007,353 | 10/1965 | Great Britain | 260/530 N |

*Primary Examiner*—Lorraine A. Weinberger
*Assistant Examiner*—Richard B. Kelly
*Attorney*—Brooks, Haidt & Haffner

[57] ABSTRACT

This invention has to do with a process for preparing (meth)acrylic acid by reacting (meth)acrolein and molecular oxygen in the vapor phase at elevated temperature in the presence of a catalyst composition consisting essentially of antimony, molybdenum, vanadium, cobalt and oxygen.

7 Claims, No Drawings

PRODUCTION OF UNSATURATED ALIPHATIC ACIDS

This application is a continuation of Ser. No. 596,086, filed Nov. 22, 1966, now abandoned.

The present invention relates to the production of unsaturated aliphatic acids and particularly to the production of acrylic and methacrylic acids.

According to the present invention a process for the production of acrylic or methacrylic acid comprises reacting at an elevated temperature in the vapor phase acrolein or methacrolein with molecular oxygen over an oxide composition containing antimony, molybdenum, vanadium and cobalt as catalyst.

The oxide composition catalysts may be regarded either as mixtures of metal oxides or as oxygen-containing compounds of the metals; under the reaction conditions the catalyst may contain either or both forms.

The catalyst may be prepared in various ways, for instance by precipitation from a mixed aqueous solution of the soluble salts of the metals by the addition of, for example, ammonia, or from the oxides, carbonates, hydroxides or hydrated oxides by suitable admixture followed if necessary by thermal decomposition of compounds such as carbonates, hydroxides or hydrated oxides to produce the corresponding oxides in situ.

By whichever method the catalyst is prepared it is preferred to prepare an oxide composition containing all the components except the molybdenum and to heat this composition in a molecular oxygen containing gas e.g. air at a temperature within the range 700° to 900°C. and then to add the molybdenum component and to heat the final composition in a molecular oxygen containing gas e.g. air at a temperature within the range 500° to 900°C.

The molybdenum component may be added in the form of the oxide or a heat decomposable compound, e.g. ammonium molybdate or molybdic acid. It is preferred to add the molybdenum component as an aqueous solution of a soluble compound, e.g. ammonium molybdate to the oxide composition of the other components and then to evaporate the mixture to dryness.

The proportions of the various components of the oxide composition catalyst may vary within moderately wide limits. Preferably the composition contains antimony, vanadium, molybdenum and cobalt in the range of atomic ratios, antimony, to vanadium of 2:1 to 5:1, antimony to molybdenum of 1:1 to 5:1 and of antimony to cobalt of 2:1 to 16:1.

The oxide composition catalysts may, if desired, be deposited upon supports such as alumina, pumice, silica or titania.

The reaction of acrolein or methacrolein with molecular oxygen over the oxide composition catalysts may be carred out in any suitable manner, for instance, as a fixed bed process in which the catalyst is used in the form of granules or pellets, or a single or multistage fluidized bed process, or as a moving bed process.

The proportion of acrolein or methacrolein in the feed to the reaction may vary within fairly wide limits, for example, between 1 and 20 percent by volume of the feed, and suitably between 2 and 10 percent by volume.

The concentration of oxygen in the feed may also vary within moderately wide limits, for example, between 1 and 20 percent by volume and preferably between 2 and 15 percent by volume. The oxygen may be diluted with inert gases, and may be, for example, supplied as air.

It is preferred to carry out the reaction in the presence of a gas which is substantially inert under the conditions of reaction, for example, nitrogen, propane, butane, isobutane, carbon dioxide and/or steam. It is preferred to use steam or nitrogen or mixtures thereof. The concentration of the steam may vary within wide limits, for example, between 10 and 60 percent by volume of the feed.

The reaction is carried out at an elevated temperature, for instance between 250° and 550°C, and preferably between 300° and 500°C. The reaction may also be carried out under pressure for example pressures of from 0.5 to 5 atmospheres absolute.

The contact time may be, for example, in the range ½ to 30 seconds and preferably between 1 and 5 seconds.

The acrylic acid may be recovered from the reaction product by any conventional method, for example, by condensation or extraction with water.

EXAMPLE

Vanadium:Antimony:Cobalt:Molybdenum catalyst (0.7:2:1:1.4)

Commercial antimony trioxide (145.5 parts by weight) was suspended in a solution of cobalt nitrate hexahydrate (145.6 parts by weight) in water (2,000 parts by weight) at 60°C and the mixture was brought to a pH of 8.7 by the addition of aqueous ammonia. The mixture was filtered and the solid washed once by resuspension for 15 minutes in water (1,000 parts by weight) and filtered. The cake was mixed with water (500 parts by weight) and commercial vanadium pentoxide (31.8 parts by weight) for 1 hour, filtered and dried at 110°C for 16 hours. The cake was broken down to pass 30 mesh (B.S.S.) mixed with graphite (1 percent by weight), pelleted and heated in air in a muffle furnace. The furnace temperature was programmed from 200° to 800°C at 22°/hour and maintained at 800°C for 16 hours. The pellets were broken down to pass 30 mesh (B.S.S.) and mixed with a solution of ammonium molybdate,

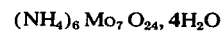

$(NH_4)_6 Mo_7 O_{24}, 4H_2O$ (123.6 parts by weight) in water (400 parts by weight) at 60°C. The slurry was evaporated to a thick paste on a steambath and dried at 110°C. for 16 hours. The cake was broken down to pass 30 mesh (B.S.S.), mixed with graphite (1percent by weight) pelleted and heated in air in a muffle furnace. The furnace temperature was programmed from 200° to 600°C at 22°/hour and maintained at 600°C for 16 hours.

A gaseous mixture of 7 percent by volume of acrolein, 5 percent by volume of oxygen, 58 percent by volume of nitrogen and 30 percent by volume of steam was passed over the catalyst in a reactor maintained at 384°C, the contact time being 3 seconds.

Of the total acrolein fed to the reactor, 46 percent was converted to acrylic acid, 18 percent to carbon oxides and 29 percent was recovered unchanged.

We claim:

1. A process for the production of an unsaturated aliphatic carboxylic acid selected from the group consisting of acrylic or methacrylic acid which comprises reacting at a temperature between 250° and 500°C, and at a contact time of from ½ to 30 seconds in the vapor phase acrolein for the production of acrylic acid or methacrolein for the production of methacrylic acid with molecular oxygen over a catalyst composition consisting essentially of antimony, molybdenum, vanadium, cobalt, and oxygen in the range of atomic ratios of antimony to vanadium of 2:1 to 5:1; antimony to molybdenum of 1:1 to 1:5; and of antimony to cobalt of 2:1 to 16:1; said catalyst composition having been prepared by forming a primary composition containing all the components except molybdenum, heating the primary composition in a molecular oxygen containing gas at a temperature within the range 700° to 900°C, adding the molybdenum component and heating the resulting composition in a molecular oxygen containing gas at a temperature within the range of 500° to 900°C.

2. A process as claimed in claim 1 wherein the molybdenum component is added in the form of a material selected from the group consisting of the oxide or a heat decomposable compound.

3. A process as claimed in claim 2 wherein the heat decomposable compound is selected from the group consisting of ammonium molybdate or molybdic acid.

4. A process as claimed in claim 3 wherein the molybdenum component is added in the form of an aqueous solution of ammonium molybdate and the resulting composition evaporated to dryness.

5. A process as claimed in claim 1 wherein the oxide composition is deposited on a support.

6. A process as claimed in claim 5 wherein the support is selected from the group consisting of alumina, pumice, silica or titania 7. A process as claimed in claim 1 carried out under pressures in range of 0.5 to 5 atmospheres absolute.

* * * * *